United States Patent
Leising et al.

(10) Patent No.: US 7,118,829 B2
(45) Date of Patent: Oct. 10, 2006

(54) PREPARATION OF COPPER SILVER VANADIUM OXIDE FROM γ-PHASE SVO STARTING MATERIAL

(75) Inventors: Randolph Leising, Williamsville, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 28 days.

(21) Appl. No.: 10/944,661

(22) Filed: Sep. 17, 2004

(65) Prior Publication Data

US 2005/0058901 A1   Mar. 17, 2005

Related U.S. Application Data

(63) Continuation-in-part of application No. 10/004,995, filed on Dec. 5, 2001, now Pat. No. 6,797,017.

(60) Provisional application No. 60/254,918, filed on Dec. 12, 2000.

(51) Int. Cl.
*H01M 4/54* (2006.01)
*C01G 5/00* (2006.01)
*C01G 31/00* (2006.01)

(52) U.S. Cl. ............... 429/219; 429/231.95; 423/594.8

(58) Field of Classification Search ............ 423/126.5, 423/593.1, 594.8, 604, 594.17; 429/231.95, 429/218.1, 219

See application file for complete search history.

(56) References Cited

U.S. PATENT DOCUMENTS

| | | |
|---|---|---|
| 4,310,609 A | 1/1982 | Liang et al. |
| 4,391,729 A | 7/1983 | Liang et al. |
| 5,221,453 A | 6/1993 | Crespi |
| 5,516,340 A * | 5/1996 | Takeuchi et al. ............ 29/623.1 |
| 5,545,497 A | 8/1996 | Takeuchi et al. |
| 5,895,733 A | 4/1999 | Crespi et al. |
| 5,955,218 A | 9/1999 | Crespi et al. |
| 6,130,005 A | 10/2000 | Crespi et al. |
| 6,171,729 B1 | 1/2001 | Gan et al. |

FOREIGN PATENT DOCUMENTS

| | | |
|---|---|---|
| EP | 0 478 303 A | 4/1992 |
| EP | 0 849 225 A | 6/1998 |
| EP | 1 146 581 A | 10/2001 |

OTHER PUBLICATIONS

Pascal Fleury, Robert Kohlmuller R.C.R. Acad.SC.Paris, 1966, 262C, 475-477.
A. Casalot, M. Puchard, M. Bull Soc. Chim. FR. 1967, 3817-3820.
E. Wenda Journal of Thermal Analysis (1985), 30, 879-887.
Solid-State Cathode Materials for Lithium Batteries: Effect of Synthesis Temperature on the Physical and Electrochemical Properties of Silver Vanadium Oxide, Randolph A. Leising and Esther Sans Takeuchi, American Chemical Society 1993.
Solid-State Synthesis and Characterization of Silver Vanadium Oxide for Use as a Cathode Material for Lithium Batteries, Randolph A. Leising and Esther Sans Takeuchi, American Chemical Society 1994.

* cited by examiner

*Primary Examiner*—Gregg Cantelmo
(74) *Attorney, Agent, or Firm*—Michael F. Scalise

(57) ABSTRACT

The current invention relates to the preparation of an improved cathode active material for non-aqueous lithium electrochemical cell. In particular, the cathode active material comprises ε-phase silver vanadium oxide prepared by using a γ-phase silver vanadium oxide starting material. The reaction of γ-phase SVO with a silver salt produces the novel ε-phase SVO possessing a lower surface area than ε-phase SVO produced from vanadium oxide ($V_2O_5$) and a similar silver salt as starting materials. Consequently, the low surface area ε-phase SVO material provides an advantage in greater long-term stability in pulse dischargeable cells.

8 Claims, No Drawings

PREPARATION OF COPPER SILVER VANADIUM OXIDE FROM γ-PHASE SVO STARTING MATERIAL

CROSS REFERENCE TO RELATED APPLICATION

This application is a continuation-in-part of application Ser. No. 10/004,995 filed 12/05/2001, now U.S. Pat. No. 6,797,017 to Leising et al., which claims priority on provisional application Ser. No. 60/254,918, filed Dec. 12, 2000.

BACKGROUND OF THE INVENTION

1. Field of the Invention

This invention relates to the conversion of chemical energy to electrical energy. More particularly, this invention relates to the preparation of an improved cathode active material for non-aqueous lithium electrochemical cells, and still more particularly, a cathode active ε-phase silver vanadium oxide (SVO, $Ag_2V_4O_{11}$) prepared using a γ-phase silver vanadium oxide ($Ag_{1.2}V_3O_{8.1}$) starting material. The product cathode active material can be used in an implantable electrochemical cell, for example of the type powering a cardiac defibrillator, where the cell may run under a light load for significant periods interrupted from time to time by high rate pulse discharges.

The reaction of γ-phase SVO with a source of silver produces ε-phase SVO that possesses a lower surface area than SVO produced from other vanadium-containing starting materials. The relatively low surface area of this new ε-phase SVO material results in greater long-term stability for the cathode active material in comparison to other forms of SVO with higher specific surfaces areas.

2. Prior Art

The prior art discloses many processes for manufacturing SVO; however, they result in a product with greater surface area than the material prepared by the current invention.

Specifically, U.S. Pat. Nos. 4,310,609 and 4,391,729, both to Liang et al., disclose the preparation of silver vanadium oxide by a thermal decomposition reaction of silver nitrate with vanadium oxide conducted under an air atmosphere. This decomposition reaction is further detailed in the publication: Leising, R. A.; Takeuchi, E. S. *Chem. Mater.* 1993, 5, 738–742, where the synthesis of SVO from silver nitrates and vanadium oxide under an air atmosphere is presented as a function of temperature. In another reference: Leising, R. A.; Takeuchi, E. S. *Chem. Mater.* 1994, 6, 489–495, the synthesis of SVO from different silver precursor materials (silver nitrate, silver nitrite, silver oxide, silver vanadate, and silver carbonate) is described. The product active materials of this latter publication are consistent with the formation of a mixture of SVO phases prepared under argon, which is not solely ε-phase $Ag_2V_4O_{11}$.

Also, the preparation of SVO from silver oxide and vanadium oxide is well documented in the literature. In the publications: Fleury, P.; Kohlmuller, R. C. R. *Acad. Sci. Paris* 1966, 262C, 475–477, and Casalot, A.; Pouchard, M. *Bull Soc. Chim. Fr.* 1967, 3817–3820, the reaction of silver oxide with vanadium oxide is described. Wenda, E. J. *Thermal Anal.* 1985, 30, 89–887, present the phase diagram of the $V_2O_5$—$Ag_2O$ system in which the starting materials are heated under oxygen to form SVO, among other materials. Thus, Fleury and Kohlmuller teach that the heat treatment of starting materials under a non-oxidizing atmosphere (such as argon) results in the formation of SVO with a reduced silver content.

U.S. Pat. Nos. 5,955,218 and 6,130,005, both to Crespi et al., relate to heat-treating silver vanadium oxide materials, for example, γ-phase SVO to form decomposition-produced SVO (dSVO). In these patents, thermal decomposition SVO prepared according to the previously discussed U.S. Pat. Nos. 4,310,609 and 4,391,729 is heated under an air atmosphere at a somewhat lower temperature of 360° C. However, the '218 and '005 patents to Crespi et al. demonstrate that adding a second heat treatment step increases the crystallinity of the resulting active material. The present invention is concerned with the product active material's surface area, and not necessarily its crystallinity.

U.S. Pat. No. 5,221,453 to Crespi teaches a method for making an electrochemical cell containing SVO, in which the cathode active material is prepared by a chemical addition reaction of an admixed 2:1 mole ratio of $AgVO_3$ and $V_2O_5$ heated in the range of 300° C. to 700° C. for a period of 5 to 24 hours. Crespi does not discuss γ-phase SVO in the context of this invention. Therefore, this process could not manufacture the ε-phase material described by the current invention.

Also, U.S. Pat. No. 5,895,733 to Crespi et al. shows a method for synthesizing SVO by using Ago and a vanadium oxide as starting materials. However, the result is not a low surface area ε-phase SVO cathode material, as disclosed in the current invention.

U.S. Pat. No. 5,545,497 to Takeuchi et al. teaches cathode materials having the general formula of $Ag_xV_2O_y$. Suitable materials comprise a β-phase SVO having in the general formula x=0.35 and y=5.18 and a γ-phase SVO having x=0.74 and y=5.37, or a mixture of the phases thereof. Such SVO materials are produced by the thermal decomposition of a silver salt in the presence of vanadium pentoxide. In addition, U.S. Pat. No. 6,171,729 to Gan et al. shows exemplary alkali metal/solid cathode electrochemical cells in which the cathode may be an SVO of β-, γ- or ε-phase materials. However, none of Gan et al.'s methods are capable of producing a low surface area ε-phase cathode material, as per the current invention.

Therefore, based on the prior art, there is a need to develop a process for the synthesis of mixed metal oxides, including silver vanadium oxide, having a relatively low surface area. An example is a low surface area SVO prepared using a silver-containing compound and γ-phase SVO as starting materials. The product ε-phase SVO is a cathode active material useful for non-aqueous electrochemical cells having enhanced characteristics, including the high pulse capability necessary for use with cardiac defibrillators.

SUMMARY OF THE INVENTION

The current invention relates to the preparation of an improved cathode active material for non-aqueous lithium electrochemical cells, and in particular, a cathode active material that contains ε-phase SVO prepared using a γ-phase SVO starting material. The reaction of γ-phase SVO with a source of silver produces ε-phase SVO possessing a lower surface area than ε-phase SVO produced from other vanadium-containing starting materials. The present synthesis technique is not, however, limited to silver salts since salts of copper, magnesium and manganese can be used to produce relatively low surface are metal oxide active materials as well. The relatively low surface area of the ε-phase SVO material provides an advantage in greater long-term stability when used as an active cathode material compared to SVO with a higher specific surface area.

DETAILED DESCRIPTION OF THE PREFERRED EMBODIMENTS

The current invention discloses that reacting a γ-phase SVO material with a source of silver, or other suitable metal salt, produces pure ε-phase SVO ($Ag_2V_4O_{11}$). This product material possesses a relatively lower surface areas in comparison to active materials synthesized by a thermal decomposition reaction under an oxidizing atmosphere. Decreased surface area is an unexpected result.

The thermal reaction of silver nitrate with vanadium oxide under an air atmosphere is a typical example of the preparation of silver vanadium oxide by a decomposition reaction. This reaction is set forth below in Equation 1:

$$2AgNO_3 + 2V_2O_5 \rightarrow Ag_2V_4O_{11} + 2NO_x \quad (1)$$

The physical characteristics of SVO material (i.e. particle morphology, surface area, crystallinity, etc.) produced by this reaction are dependent on the temperature and time of reaction. In addition, the reaction environment has a dramatic effect on the product material. The same reaction of silver nitrate with vanadium oxide conducted under an argon atmosphere is depicted below in Equation 2:

$$2AgNO_3 + 2V_2O_5 \rightarrow AgVO_3 + Ag_{1.2}V_3O_8 + 2NO_x \quad (2)$$

Thus, the synthesis of SVO under an inert atmosphere results in the formation of a mixture of silver vanadate ($AgVO_3$) and γ-phase SVO ($Ag_{1.2}V_3O_8$). This is described in the above-referenced publication by Leising, R. A.; Takeuchi, E. S. Chem. Mater. 1994, 6, 489–495. As reported by Leising et al., a mixture of material phases is less suitable than a single ε-phase SVO ($Ag_2V_4O_{11}$) as a cathode active material for lithium electrochemical cells. For this reason, argon is typically not preferred for synthesis of SVO cathode active material.

A more benign preparation technique for ε-phase SVO from vanadium oxide and silver carbonate ($Ag_2CO_3$) according to Equation 3 below results in the release of $CO_2$ gas, which is a nontoxic byproduct. However, the specific surface area of the product SVO is also higher than the surface area of SVO prepared from silver nitrate. This is shown below in Table 1.

$$Ag_2CO_3 + 2V_2O_5 \rightarrow Ag_2V_4O_{11} + CO_2 \quad (3)$$

Thus, a synthesis technique for SVO using vanadium oxide and either silver oxide or silver carbonate, or other preferred metal salts, while eliminating the formation of toxic $NO_x$ byproduct, results in an SVO material with a higher specific surface area than SVO produced from vanadium oxide and silver nitrate.

TABLE 1

Specific Surface Area of ε-Phase SVO

| Starting Materials | Synthesis Temperature | BET Surface Area |
|---|---|---|
| $V_2O_5$ + $AgNO_3$ | 500° C. | 0.42 m²/g |
| $V_2O_5$ + 0.5$Ag_2O$ | 500° C. | 0.64 m²/g |
| $V_2O_5$ + 0.5$Ag_2CO_3$ | 500° C. | 0.81 m²/g |
| $Ag_{1.2}V_3O_{8.1}$ + 0.15$Ag_2O$ | 500° C. | 0.54 m²/g |
| $Ag_{1.2}V_3O_{8.1}$ + 0.15$Ag_2CO_3$ | 500° C. | 0.44 m²/g |

The present invention is an alternate preparation synthesis that does not produce noxious by-products, such as $NO_x$ and, additionally, results in an active material with a desirable relatively low surface area. Benefits attributed to the present synthesis process for the formation of a cathode active material are illustrated in the following examples.

EXAMPLE 1

In contrast to the prior art syntheses described above, SVO of the present invention is prepared using γ-phase SVO ($Ag_{1.2}V_3O_{8.1}$) as a starting material instead of $V_2O_5$. In particular, a 12.90-gram sample of $Ag_{1.2}V_3O_{8.1}$ was combined with a 1.09-gram sample of $Ag_2O$, and heated to 500° C. under a flowing air atmosphere for about 16 hours. The sample was then cooled, mixed and reheated under a flowing air atmosphere at about 500° C. for about 24 hours. At this point, the material was cooled and analyzed by x-ray powder diffraction and BET surface area measurements. The x-ray powder diffraction data confirmed the formation of ε-phase SVO ($Ag_2V_4O_{11}$). The material displayed a BET surface area of 0.54 m²g.

COMPARATIVE EXAMPLE 1

As a comparison, SVO was prepared by a prior art combination reaction. In particular, a 9.00-gram sample of $V_2O_5$ was combined with a 5.73-gram sample of $Ag_2O$, and heated to about 500° C. under a flowing air atmosphere for about 16 hours. The sample was then cooled, mixed and reheated under a flowing air atmosphere at about 500° C. for about 24 hours. At this point the material was cooled and analyzed by x-ray powder diffraction and BET surface area measurements. The material displayed a BET surface area of 0.64 m²/g, which is significantly higher than the specific surface area of the material prepared in Example 1.

EXAMPLE 2

Epsilon-phase SVO according to the present invention was also prepared using a γ-phase SVO starting material in combination with silver carbonate. In particular, a 5.00-gram sample of $Ag_{1.2}V_3O_{8.1}$ was combined with a 0.50-gram sample of $Ag_2CO_3$, and heated to about 500° C. under a flowing air atmosphere for about 16 hours. The sample was then cooled, mixed and reheated under a flowing air atmosphere at about 500° C. for about 24 hours. At this point, the material was cooled and analyzed by x-ray powder diffraction and BET surface area measurements. The x-ray powder diffraction data confirmed the formation of ε-phase SVO ($Ag_2V_4O_{11}$), while the material displayed a BET surface area of 0.44 m²/g.

COMPARATIVE EXAMPLE 2

As a comparison to Example 2, SVO was prepared using $V_2O_5$ and $Ag_2CO_3$. In particular, a 15.00-gram sample of $V_2O_5$ was combined with an 11.37-gram sample of $Ag_2CO_3$, and heated to about 450° C. under a flowing air atmosphere for about 16 hours. The sample was then cooled, mixed and reheated under a flowing air atmosphere at about 500° C. for about 24 hours. At this point the material was cooled and analyzed by x-ray powder diffraction and BET surface area measurements. The material displayed a BET surface area of 0.81 m²/g, which is nearly twice the specific surface area of the material prepared in Example 2.

EXAMPLE 3

Copper silver vanadium oxide or CSVO ($Cu_{0.2}Ag_{0.8}V_2O_{5.6}$) was prepared according to the present invention using γ-phase SVO as a starting material in combination with copper(II) oxide. In particular, a 1.80-gram sample of $Ag_{1.2}V_3O_{8.1}$ was combined with a 0.10-gram sample of CuO, and heated to about 450° C. under a flowing air atmosphere for about 16 hours. The sample was then cooled, mixed and reheated under a flowing air atmosphere at about 500° C. for about 24 hours. At this point, the material was cooled and analyzed by BET surface area measurements. The material displayed a BET surface area of 0.31 m²/g.

COMPARATIVE EXAMPLE 3

As a comparison to the product of Example 3, CSVO was prepared via the prior art decomposition method using $V_2O_5$, $Cu(NO_3)_2$ and $AgNO_3$. In particular, a 1.36 gram sample of $V_2O_5$ was combined with a 0.99 gram sample of $AgNO_3$ and a 0.34 gram sample of $Cu(NO_3)_2 \cdot 2.5H_2O$, and heated to about 400° C. under a flowing air atmosphere for about 16 hours. The sample was then cooled, mixed and reheated under a flowing air atmosphere at about 500° C. for about 44 hours. At this point, the product material was cooled and analyzed by BET surface area measurement. The material displayed a BET surface area of 0.45 m²/g, which is significantly higher than the specific surface area of the CSVO material prepared in Example 3. Thus, in addition to the toxic implications of released $NO_x$ gas, the preparation of CSVO by the prior art method provides a material with a higher specific surface area than the new preparation technique.

The above detailed description and examples are intended for the purpose of illustrating the invention, and are not to be construed as limiting. For example, starting materials other than silver oxide and silver carbonate are reacted with γ-phase silver vanadium oxide to form ε-phase silver vanadium compounds. The list includes: silver lactate ($AgC_3H_5O_3$, $T_m$ 120° C.), silver triflate ($AgCF_3SO_3$, $T_m$ 286° C.), silver pentafluoropropionate ($AgC_3F_5O_2$, $T_m$ 242° C.), silver laurate ($AgC_{12}H_{23}O_2$, $T_m$ 212° C.), silver myristate ($AgC_{14}H_{27}O_2$, $T_m$ 211° C.), silver palmitate ($AgC_{16}H_{31}O_2$, $T_m$ 209° C.), silver stearate ($AgC_{18}H_{35}O_2$, $T_m$ 205° C.), silver vanadate ($AgVO_3$, $T_m$ 465° C.), copper oxide (CuO, $T_m$ 1,446° C.), copper carbonate ($Cu_2CO_3$), manganese carbonate ($MnCO_3$), manganese oxide (MnO, $T_m$ 1,650° C.), magnesium carbonate ($MgCO_3$, $T_d$ 350° C.), magnesium oxide (MgO, $T_m$ 2, 826° C.), and combinations and mixtures thereof.

While the starting materials are described as being heated to a preferred temperature of about 500° C., it is contemplated by the scope of the present invention that suitable heating temperatures range from about 300° C. to about 550° C., depending on the specific starting materials. Also, heating times for both the first and second heating step range from about 5 hours to about 30 hours. Longer heating times are required for lower heating temperatures. Further, while the present invention has been described in the examples as requiring two heating events with an ambient mixing in between, that is not necessarily imperative. Some synthesis protocols according to the present invention may require one heating step with periodic mixing, or multiple heating events with periodic ambient mixing.

The product mixed metal oxides according to the present invention include: ε-phase SVO ($Ag_2V_4O_{11}$), CSVO ($Cu_{0.2}Ag_{0.8}V_2O_{5.6}$), MnSVO ($Mn_{0.2}Ag_{0.8}V_2O_{5.8}$), and MgSVO ($Mg_{0.2}Ag_{0.8}V_2O_{5.6}$). The use of the above mixed metal oxides as a cathode active material provides an electrochemical cell that possesses sufficient energy density and discharge capacity required to meet the vigorous requirements of implantable medical devices. These types of cells comprise an anode of a metal selected from Groups IA, IIA and IIIB of the Periodic Table of the Elements. Such anode active materials include lithium, sodium, potassium, etc., and their alloys and intermetallic compounds including, for example, Li—Mg, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

Before the previously described ε-phase active materials are fabrication into a cathode electrode for incorporation into an electrochemical cell, they are preferably mixed with a binder material, such as a powdered fluoro-polymer, more preferably powdered polytetrafluoro-ethylene or powdered polyvinylidene fluoride, present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as of nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material. For example, depending on the application of the electrochemical cell, the range of cathode compositions is from about 99% to about 80%, by weight, ε-phase silver vanadium oxide mixed with carbon graphite and PTFE.

Cathode components for incorporation into an electrochemical cell according to the present invention may be prepared by rolling, spreading or pressing the cathode active materials onto a suitable current collector selected from the group consisting of stainless steel, titanium, tantalum, platinum, gold, aluminum, cobalt-nickel alloys, nickel-containing alloys, highly alloyed ferritic stainless steel containing molybdenum and chromium, and nickel-, chromium- and molybdenum-containing alloys. The preferred current collector material is titanium and, most preferably, the titanium cathode current collector has a thin layer of graphite/carbon material, iridium, iridium oxide or platinum applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a nonaqueous, ionically conductive electrolyte that serves as a medium for migration of ions between the anode and the cathode electrodes during the electrochemical reactions of the cell. The electrochemical reaction at the electrodes involves conversion of ions in atomic or molecular forms that migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. Preferably, the ion forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. Suitable high permittivity solvents include cyclic carbonates, cyclic esters and cyclic amides such as propylene carbonate (PC), ethylene carbonate (EC), butylene carbonate (BC), acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

The preferred form of a primary alkali metal/solid cathode electrochemical cell is a case-negative design wherein the anode is in contact with a conductive metal casing and the cathode contacted to a current collector is the positive terminal. The cathode current collector is in contact with a positive terminal pin via a lead of the same material as the current collector. The lead is welded to both the current collector and the positive terminal pin for electrical contact.

A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a titanium plug over the fill hole, but not limited thereto. The cell of the present invention can also be constructed in a case-positive design.

It is appreciated that various modifications to the inventive concepts described herein may be apparent to those of ordinary skill in the art without departing from the spirit and scope of the present invention as defined by the appended claims.

What is claimed is:

1. A cathode for an electrochemical cell, the cathode comprising an electrode active material characterized as prepared from γ-phase silver vanadium oxide having the formula $Ag_{1.2}V_3O_{8.1}$ mixed with $C_uO$ to form a reaction mixture heated to at least one reaction temperature in an oxidizing atmosphere to produce $Cu_{0.2}Ag_{0.8}V_2O_{5.6}$ having a BET surface area of about 0.31 m²/gram.

2. The cathode of claim 1 wherein the reaction mixture is heated to the at least one reaction temperature in a range from about 300° C. to about 550°C.

3. The cathode of claim 1 wherein the reaction mixture is heated to the at least one reaction temperature for about 5 hours to about 30 hours.

4. The cathode of claim 1 further comprising a binder and a conductive material.

5. A nonaqueous electrochemical cell, comprising:
   a) an anode;
   b) a cathode containing an electrode active material characterized as having been prepared from a mixture of γ-phase silver vanadium oxide having the formula $Ag_{1.2}V_3O_{8.1}$ and CuO forming a reaction mixture heated to at least one reaction temperature in an oxidizing atmosphere to produce $CU_{0.2}Ag_{0.8}V_2O_{5.6}$ having a BET surface area of about 0.31 m²/gram; and
   c) a non-aqueous electrolyte activating the anode and the cathode; and
   d) a separator material electrically insulating the anode from the cathode, and of a porosity to allow for electrolyte flow.

6. The electrochemical cell of claim 5 wherein the anode is comprised of lithium.

7. The electrochemical cell of claim 5 wherein the reaction mixture is heated to the at least one reaction temperature in a range from about 300° C. to about 550°C.

8. The electrochemical cell of claim 5 wherein the reaction mixture is heated to the at least one reaction temperature for about 5 hours to about 30 hours.

* * * * *